INVENTOR
CHARLES L. MAMZIC
ATTORNEY

INVENTOR
CHARLES L. MAMZIC
ATTORNEY

July 8, 1969

C. L. MAMZIC 3,454,044

PNEUMATIC CONTROL APPARATUS

Filed Oct. 3, 1966

INVENTOR
CHARLES L. MAMZIC

BY
Z. T. Wolbersmith
ATTORNEY

July 8, 1969      C. L. MAMZIC      3,454,044

PNEUMATIC CONTROL APPARATUS

Filed Oct. 3, 1966      Sheet 4 of 5

INVENTOR
CHARLES L. MAMZIC
BY
ATTORNEY

INVENTOR
CHARLES L. MAMZIC
BY
ATTORNEY

United States Patent Office 3,454,044
Patented July 8, 1969

3,454,044
PNEUMATIC CONTROL APPARATUS
Charles L. Mamzic, Lansdale, Pa., assignor to Moore Products Co., Spring House, Pa., a corporation of Pennsylvania
Continuation-in-part of abandoned application Ser. No. 381,369, July 9, 1964. This application Oct. 3, 1966, Ser. No. 583,795
Int. Cl. F15b 5/00; F15c 3/10; F16k 31/12
U.S. Cl. 137—594                              12 Claims

ABSTRACT OF THE DISCLOSURE

Control system with selective manual or automatic fluid pressure control of a process in which auxiliary automatic adjusting structure is provided for maintaining the manual fluid pressure source at the proper level at all times to permit selecting the manual mode without discontinuity. The adjusting mechanism features a pressure comparator which continuously compares the manual or automatic control pressures and drives a pneumatic motor or readjust the manual pressure as required to make it agree with the automatic control pressure whenever the system is operating in the automatic control mode.

---

This application is a continuation in part of application filed July 9, 1964, Ser. No. 381,369 now abandoned.

This invention relates to pneumatic control apparatus and more particularly to a control system with selective manual or automatic control.

Various systems have heretofore been proposed for shifting from manual to automatic control or vice versa and have accomplished such transfers without introducing a "bump" into the process being controlled. One such system is shown in the patent to C. B. Moore, No. 2,706,-994 and another is shown in the patent to C. L. Mamzic, No. 2,969,080. These systems, as well as a number of other systems which have been proposed, required sealing off the final operator between the two operating conditions.

Other systems for selective manual or automatic control have been proposed which did not require any sealing off but these still require manual adjustment of one or more of the controls or settings immediately prior to switching in one or both directions in order to avoid a "bump."

Eller, in Patent No. 2,939,472 shows a system which does not require sealing off the final operator because he provides standby manual control means which is continuously and automatically maintained at the correct level for immediate switching into the manual control mode without "bumping" the process. Eller, however, employs a follower system with an open loop in which the correspondence between the transmitted output and the impressed input can be achieved only by carefully calibrating and matching the input element with the output element.

It is an important object of the present invention to obviate the requirement of such careful calibration and matching of components by the use of a closed loop follower system in which the transmitted pressure is compared to the received pressure in a simple comparator relay whose output provides sufficient adjustment to the transmitted pressure to insure that it matches the received input to any desired degree of accuracy.

It is a further object of the present invention to provide a control system with selection, as desired, of manual or automatic control in which the components are simple in construction and reliable in operation.

It is a further object of the present invention to provide a control system with selection, as desired, of manual or automatic control, which is independent of ambient temperature fluctuations.

It is a further object of the present invention to provide a control system which is inherently flexible and adaptable to a variety of control circuits and requirements.

It is a further object of the present invention to provide a manual-automatic control system which may be switched from a number of different locations including remote locations.

It is a further object of the present invention to provide a system where a number of manual-automatic control stations can be simultaneously switched to the manual mode by a single control element.

It is a further object of the present invention to provide a control station in which the controls function in the same manner in both modes of operation so as to avoid confusion to the operator.

Other objects and advantageous features of the invention will be apparent from the description and claims.

The nature and characteristic features of the invention will be more readily understood from the following description taken in connection with the accompanying drawings forming part thereof, in which.

Figure 1:
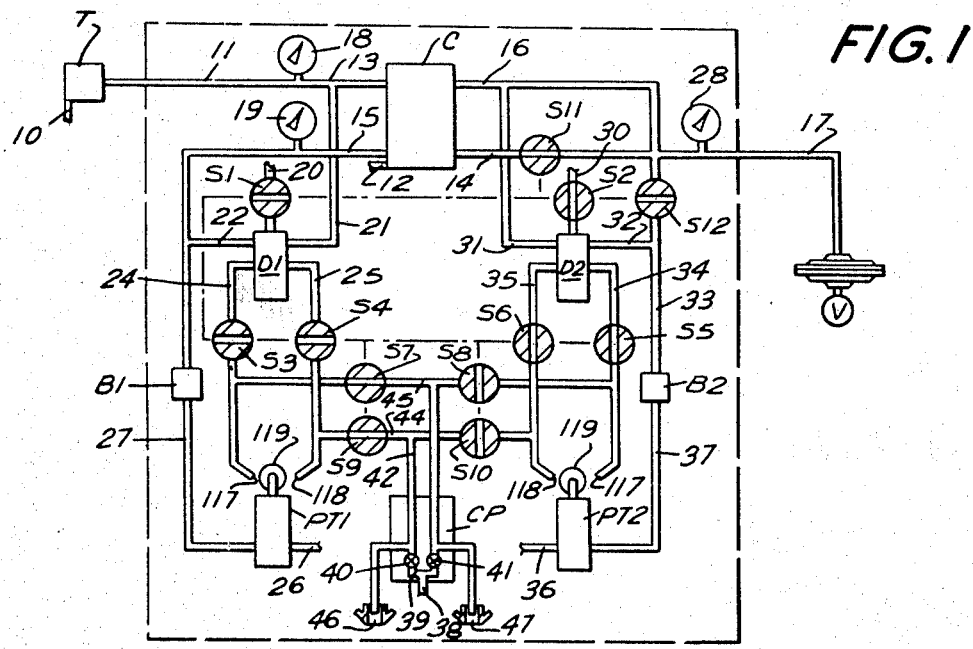
FIGURE 1 is a schematic arrangement of a preferred form of pneumatic control apparatus in accordance with the invention and in the condition for automatic control.

It should, of course, be understood that the description and drawings herein are illustrative merely, and that various modifications and changes can be made in the structure disclosed without departing from the spirit of the invention.

Like numerals refer to like parts throughout the several views.

The apparatus of the present invention includes a control system having manual to automatic switching provisions wherein switching may be accomplished at any time in either direction and without delay, without creating any discontinuity in the control of the process and without requiring that the operator match or compare pressures.

The apparatus of the present invention accomplishes the foregoing in both modes of control by providing standby pressures which are instantly available for loading of the final control element or for set point loading of the automatic controller and these standby pressures are maintained at the required levels through a closed loop comparator system which is inherently free from calibration errors, ambient temperature errors and drift or the effects of aging.

Referring now more particularly to FIGS. 1 to 4 of the drawings, a fluid pressure transmitter T is provided which may be of any preferred type, such as is shown in prior U.S. Patent No. 2,312,201 or in Patent No. 2,556,436.

The transmitter T has a supply connection 10 from a source of fluid pressure, such as air under pressure. The transmitter T transmits through a fluid connection 11, an analog signal which is fluid pressure related to the value of the condition at the particular location where the transmitter T is employed. The transmitter T can transmit a signal pressure which is related to temperature, pressure, flow, or other variables in a vessel or pipe (not shown). An indicator 18 may be provided connected to the fluid connection 11 to display the level of the pressure therein.

A controller C is provided and can be of any desired type such as those described in U.S. Patents Nos. 2,518,244, 2,520,468, or 2,969,080. The controller C has a supply connection 12 to any suitable source of fluid, such as air under pressure, an input connection 13 to which the fluid connection 11 is connected, a fluid connection 14 for transmitting a controlled output pressure, a fluid connection 15 for supply of a control point setting pressure, which may be indicated on an indicator 19, and a fluid connection 16 for application in the controller C of a feedback pressure.

The device to be controlled may be a diaphragm operated valve V, or other fluid pressure responsive device, having a fluid connection 17 communicating therewith for the supply of fluid pressure thereto for controlling the device. An indicator 28 may be connected to the fluid connection 17.

A first differential detector D1 is provided having a fluid connection 20 to a source of pressure fluid, such as air under pressure, and a fluid connection 21 to the fluid connection 11 for making available the signal pressure from the transmitter T. The detector D1 also has a fluid connection 22 which is connected to a fluid connection 23 leading from a booster pilot valve B1 and to the control point setting connection 15 for the controller C. The detector D1 has directional output connections 24 and 25, through one or the other of which fluid pressure can be supplied.

The fluid connections 24 and 25 are also connected to a first pressure transmitter PT1 which has a pressure fluid supply connection 26, connected to a source of fluid, such as air under pressure, a fluid delivery connection 27 connected to the booster pilot valve 81.

A second differential detector D2 is provided having a fluid connection 30 to a source of pressure fluid, such as air under pressure, and a fluid connection 31 to the fluid connection 16 for making available the signal pressure corresponding to the feedback pressure. The detector D2 also has a fluid connection 32 which is connected to a fluid connection 33 leading from a booster pilot valve B2 and to the feedback connection 16 of the controller C. The detector D2 has directional output connections 34 and 35, through one or the other of which fluid pressure can be supplied.

The fluid connections 34 and 35 are also connected to a second pressure transmitter PT2 which has a pressure fluid supply connection 36 connected to a source of fluid, such as air under pressure, and a fluid connection 37 connected to the booster pilot valve B2.

A control port device CP is provided having a pressure fluid supply connection 38 to a source of fluid, such as air under pressure. The control port device CP has a branch fluid connection 39 with restrictions 40 and 41 leading to fluid connections 42 and 43. The fluid connection 42 is connected by fluid connection 44 to the fluid connections 25 and 35 and the fluid connection 43 is connected by the fluid connection 45 to the fluid connections 24 and 34. Control ports 46 and 47 connected respectively to the fluid connections 42 and 43, and to the atmosphere, and dependent upon their open or closed condition determine whether fluid is discharged through either or both ports 46 and 47 from the fluid connections 42 and 43 or pressure is built up in the fluid connections 42 or 43 for delivery through such connections as pointed out below.

In order to select automatic control or manual control a plurality of switches or valves are provided. These preferably include switches S1 and S2 in the supply connections 20 and 30 to the differential detectors D1 and D2, switches S3, S4, S5 and S6 in the fluid connections 24, 25, 34 and 35, respectively, and switches S7 and S8, in the fluid connections 45 and S9 and S10 in the fluid connection 44.

A switch S11 is also provided controlling the communication between the fluid connections 14 and 17 and a switch S12 is provided controlling the communication between the fluid connections 16 and 32 and 33.

Figure 2:
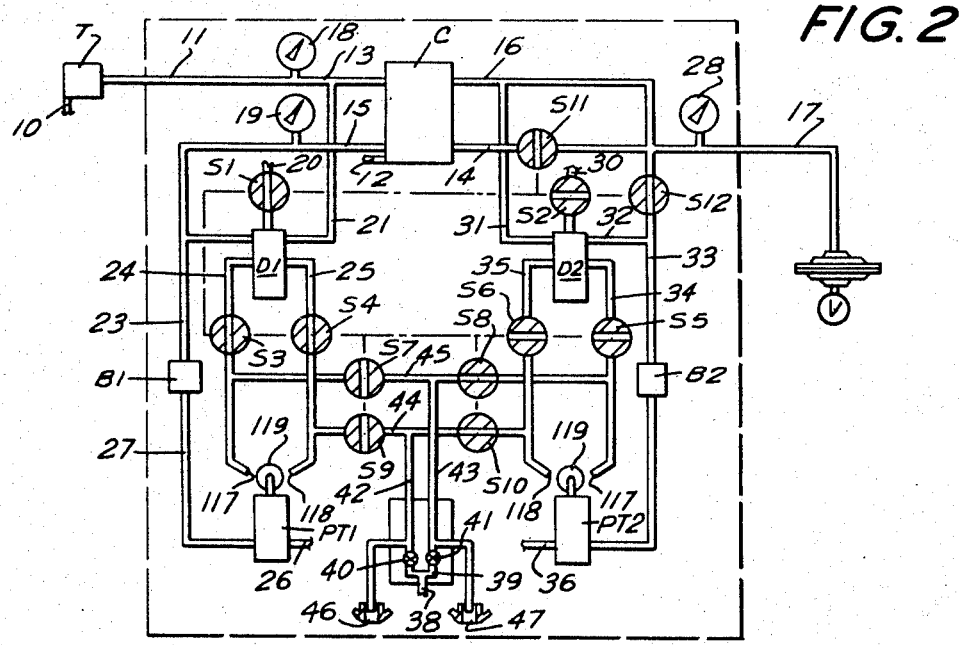
FIG. 2 is a view similar to FIG. 1 showing the apparatus in the condition for manual control.

The switches S1 to S12 are preferably mechanically interconnected for simultaneous operation from the positions shown in FIG. 1 to the position shown in FIG. 2, or vice versa.

Figure 3:
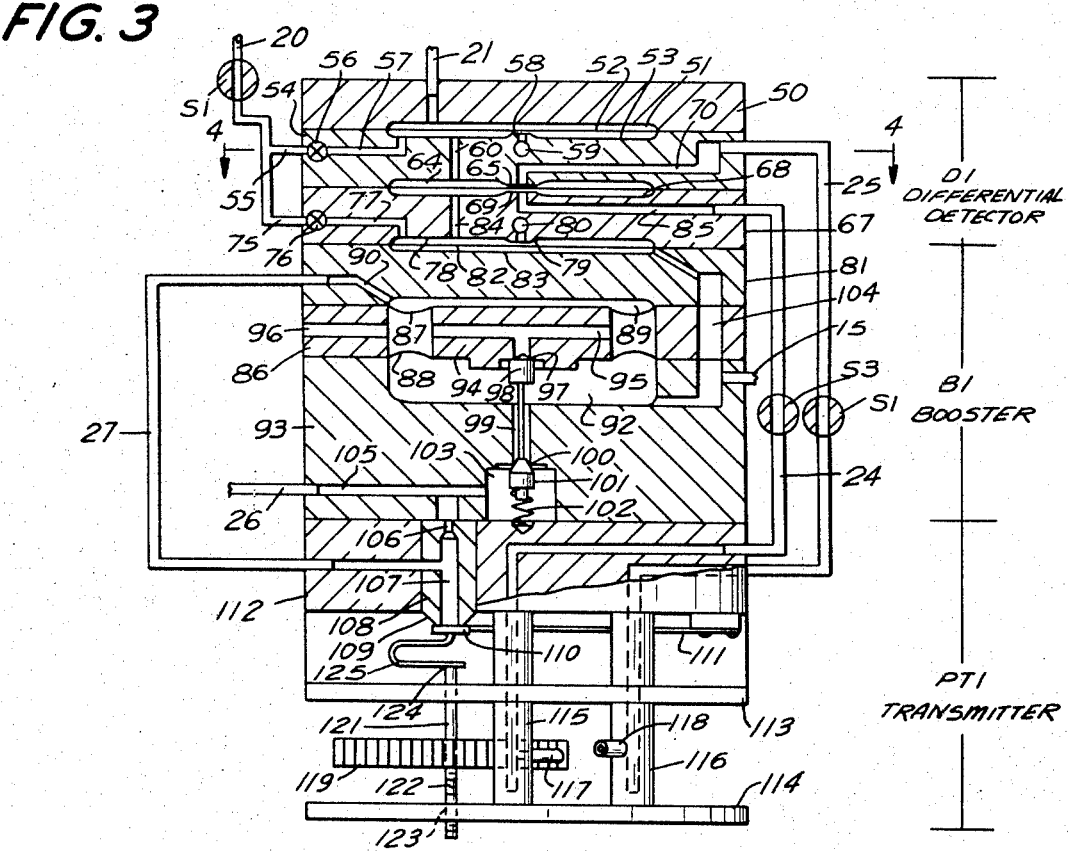
FIG. 3 is a diagrammatic view of detector and transmitter structure employed in FIGS. 1 and 2.
Figure 4:
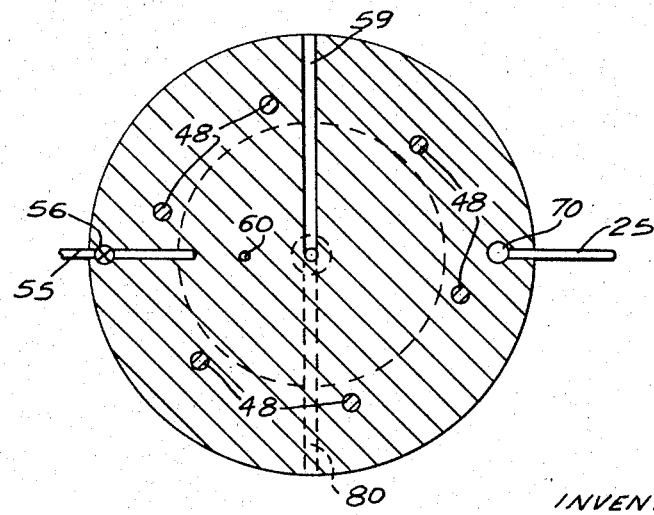
FIG. 4 is a transverse sectional view taken approximately on the line 4—4 of FIG. 3.

While the differential detectors D1 and D2, the booster pilot valves B1 and B2, and the pressure transmitters PT1 and PT2 can be of any desired type, one suitable construction is shown partially diagramatically in FIGS. 3 and 4. Since the construction of each group of units B1, D1, PT1 and B2, D2 and PT2 is the same, a description of one group should suffice.

The differential detector D1 is preferably formed of a plurality of components in a stack arrangement on mounting studs 48 includes a casing section 50 having a chamber 51 with which the fluid connection 21 is in communication.

A diaphragm 52 is provided closing one side of the chamber 51 and of a chamber 53 in a casing section 54.

The casing section 54 has a supply fluid connection 55 to a source of fluid pressure, such as air under pressure, which is connected through a restriction 56, and a fluid connection 57 to the chamber 53. The supply connection 55 is preferably connected to the source 20 through the valve S1. A vent nozzle 58 in the chamber 53 and communicating with the atmosphere through a fluid connection 59 is controlled by the positioning of the diaphragm 52 with respect thereto.

The chamber 53 is connected by a fluid connection 60 to a chamber 64 formed in a face of the housing section 54 and has a detector nozzle 65 controlled by the positioning of a diaphragm 66 which forms a boundary of the chamber 64 and is interposed between the casing section 54 and a casing section 67. The casing section 67 has a chamber 68 in opposed relation to the chamber 64.

The chamber 68 has a detector nozzle 69 in opposed relation to the nozzle 65 on the opposite side of the diaphragm 66. The nozzle 65 is connected by a fluid passageway 70 to the fluid connection 25.

The housing section 67 has a supply connection 75 to a source of pressure fluid, such as air under pressure, which is connected through a restriction 76 and fluid connection 77 to a chamber 78 formed on a face of the casing section 67. The supply connection 75 is preferably connected to the source 20 through the valve S1.

The chamber 78 has a discharge nozzle 79 connected by a vent passageway 80 to the atmosphere. A diaphragm 82 is provided in the chamber 78 and controls the discharge through the nozzle 79.

A casing section 81 is provided with a chamber 83 therein in opposed relation to the chamber 78 and with the diaphragm 82 providing a boundary thereof.

A fluid connection 84 is provided connecting the chamber 78 and the chamber 68. The nozzle 69 has a fluid passageway 85 extending therefrom and connected to the fluid connection 24.

The booster B1, preferably having a one to one input-output pressure ratio, includes a multiple diaphragm assembly section 86 having diaphragms 87 and 88 on opposite faces thereof. The diaphragm 87 forms a boundary of a chamber 89, in the casing section 81, which is connected by a passageway 90 to the output connection 27 of the transmitter PT1.

The diaphragm 88 provides a boundary of a chamber 92 in a casing 93. The diaphragms 87 and 88 have a rigid central spacer 94 therebetween and to which they are secured. The spacer 84 has a vent passageway 95 connected to atmosphere, through a vent passageway 96. Fluid flow to the passageway 95 is determined by the positioning of the spacer 94 and a valve plug 98 movable with respect to a valve seat 97 communicating with the passageway 95. The valve plug 98 extends within a passageway 99 in the housing 93.

The passageway 99, at the lower end thereof, has a valve seat 100 and is engageable by the valve plug 101 connected to and movable with the valve plug 98. A spring 102 in a chamber 103 urges the valve plug 101 toward engagement with the valve seat 100 and the valve plug 98 toward engagement with the valve seat 97 dependent upon the pressure conditions in the chambers 89 and 92.

The chamber 92 is connected by a passageway 104 to the chamber 83.

The fluid connection 104 also has connected thereto the fluid connection 15. The supply connection 26 is connected by a passageway 105 to the chamber 103. The transmitter PT1 includes a housing section 112. The passageway 105 is connected through a restriction 106 to a passageway 107 with which the fluid connection 27 is in communication. The restriction 106 and passageway 107 are located in a nozzle block 108 which has an end terminal and nozzle 109 controlled by a nozzle control plate 110, carried on a flexible arm 111.

The housing section 112 carries the arm 111 and has the nozzle block 108 mounted therein. A plate 113 is provided in spaced relation to the housing section 112 and has a plate 114 parallel thereto. Spacer posts 115 and 116 interposed between the housing section 112 and the plate 113 and between the plates 113 and 114 serve to carry nozzles 117 and 118 directed in opposed relation with respect to a turbine wheel 119.

The turbine wheel 119 is secured to a shaft 121 which is journaled in the plate 113 and has a threaded portion 122 in engagement with a complemental threaded portion 123 in the plate 114 for changing the position of the shaft 121.

The end 124 of the shaft 121 is in engagement with U shaped leaf spring 125 which is carried on the nozzle plate 110 for changing the position of the nozzle plate 110 with respect to the nozzle 109 for varying the discharge of fluid therefrom and changing the pressure within the passageway 107 and locations connected thereto.

In the group of units B2, D2 and PT2, the supply 30 is connected through valve S2 and the pressure transmitter PT2 has its supply connection 36. The chamber 51 is connected to either of the fluid connections 31 or 32 and the fluid connection 104 to the chamber 83 is connected to the other of the fluid connections 31 and 32.

The mode of operation will now be pointed out.

Referring first to FIG. 1, the transmitter T supplies a signal through the fluid connection 11 to the input connection 13 of the controller C. The controller C supplies a signal controlled by the signal from the transmitter T, through the transmitting connection 14, the valve S11, and fluid connection 17 to the valve V. A feedback pressure is supplied to the controller C through feedback connection 16.

The control point setting pressure to the connection 15 is supplied through the pressure transmitter PT1, the fluid connection 27, the booster pilot B1 and the fluid connection 23.

The feedback pressure from the fluid connection 16 is available through the fluid connection 31 to the differential detector D2 where it is compared with a pressure supplied from the pressure transmitter PT2 from the source 36 and through the booster pilot B2. The source 30 is available through the valve S2 to supply fluid pressure either to the fluid connection 34 or 35 to drive the turbine wheel 119 to control the nozzle 109 and thereby the matching pressure in the fluid connection 32.

The pressures in the fluid connection 34 and 35 cannot be varied by the control port device CP because the valves S8 and S10 are in closed condition.

At the same time the transmitted pressure effective in the fluid connection 11 is available at the differential detector D1. The source 20 is, however, shut off by the closed condition of valve S1 and the output connections 24 and 25 are shut off by the valves S3 and S4 in closed condition.

Automatic control of the process is accordingly effected in the usual manner.

While automatic control of the process is being effected the feedback pressure from the controller C continuously holds the pressure from the transmitter PT2 to an equal value in readiness for assumption or resumption of manual control without any delay or manipulation in preparation for the shift to manual control. The valves S8, S10 and S12 in closed condition prevent undesired utilization of the matched pressure.

If now it is desired to shift to manual control of the process the valves S1 to S12 are simultaneously shifted from their positions as shown in FIG. 1 to their positions as shown in FIG. 2.

It will be noted that the valve S11 cuts off communication between the output connection 14 of the controller C and the fluid connection 17 and the valve S12 simultaneously connects the fluid connection 33 to the fluid connection 17 for manual control. The supply connection 30 is cut off by the valve S2 and the output connections 34 and 35 are cut off from communication with the pressure transmitter PT2 but communication is established through the valves S8 and S10 with the control port device CP for permitting manual control.

By manipulation of the ports 46 and 47 pressure fluid can be selectively applied either through the fluid connection 43 and 44, and the valves S8 and S10, to rotate the turbine wheel 119 of the pressure transmitter PT2 and thereby determine the manual setting pressure applied to the valve V by the pressure of the fluid established in the fluid connections 37 and 33.

When manual control of the process is being effected a comparison is also being made in the differential detector D1 of the transmitted pressure from the transmitter T and the control point setting pressure. The differential detector D1 controls the pressure transmitter PT1 through valves S3 and 54 in open condition.

Manual manipulation at the control port device CP does not affect the pressure transmitter PT1 because the valves S7 and S9 are in closed condition.

In this manner the output pressure of the pressure transmitter PT1 continuously holds the set point of the controller C at a value equal to the process transmitted pressure from the transmitter T in readiness for resumption of automatic control without any delay or manipulation in preparation for the shift to automatic control.

Further shifts, as desired can be readily effected.

Figure 5:
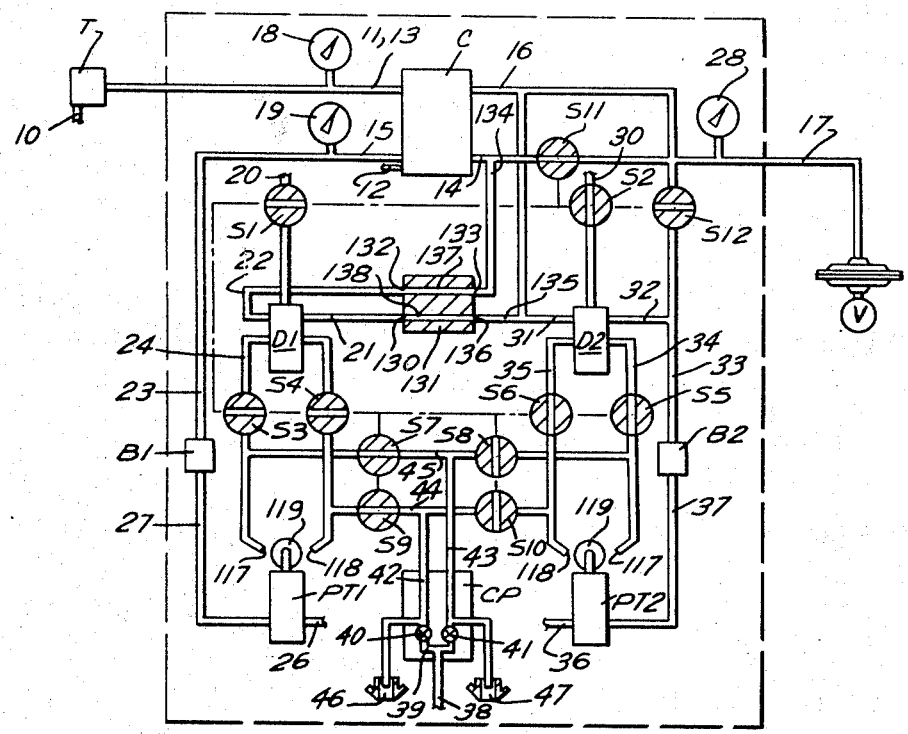
FIG. 5 is a schematic arrangement of another preferred form of pneumatic control apparatus and in the condition for automatic control.
Figure 6:
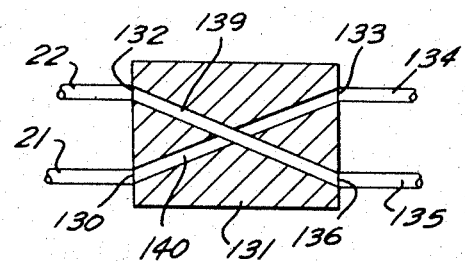
FIG. 6 is a schematic view of another position of the reversing plate of FIG. 5 for a different character of controller operation.

Referring now to FIGS. 5 and 6 in the form of the invention there shown the fluid connection 21 is connected to a port 130 of a reversing plate device 131 and the fluid connection 22 is connected to a port 132 of the plate device 131. The plate device 131 has a port 133 to which a fluid connection 134 connects to the fluid connection 14 and a fluid connection 135 which connects the fluid connection 31 to a port 136.

Within the interior of the reversing plate device 131, and as shown in FIG. 5 straight through connections 137 and 138 are provided for operation with automatic control and with manual control. The connection 137 respectively connects the ports 132 and 133 and the connection 138, respectively connects the ports 130 and 136.

The valves S1 to S12, in the form of the invention shown in FIG. 5 are positioned as shown in FIG. 1 for automatic operation and as shown in FIG. 2 for manual operation.

It will be noted that while automatic control of the process is being effected the output pressure from the controller C continuously holds the pressure from the transmitter PT2 to an equal value in readiness for resumption of manual control, without any delay, or manipulation preparatory to the shift, the valves S8, S10 and S12 in closed condition preventing undesired utilization of the matched pressures.

If the valves S1 to S12 are shifted to positions for manual control, a comparison is made in the differential detector D1 of the operating pressure from the transmitter PT2 and the output pressure from the controller C in readiness for resumption of automatic control without any delay or manipulation preparatory to the shift.

As shown in FIG. 6, the reversing plate device 131 in its other position has a cross connection 139 for respectively connecting the ports 132 and 136 and a cross connection 140 for respectively connecting the ports 130 and 133. The reversing plate device 131 is utilized to match the action of the differential detector D1 to the pressure transmitter PT1 so that it is compatible with the action of the controller C since the controller action is reversible.

Figure 7:
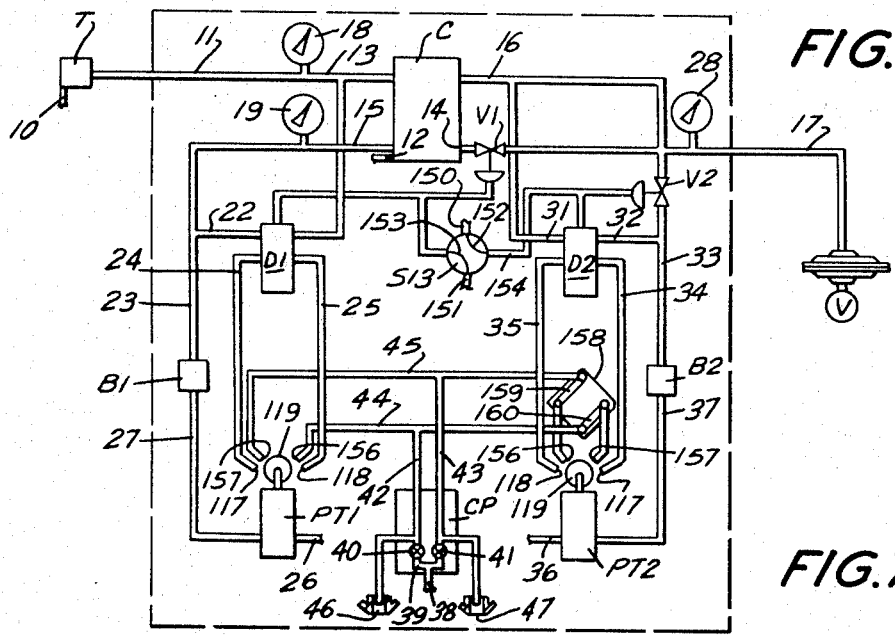
FIG. 7 is a schematic view of another preferred form of the invention especially adapted to remote switching.
Figure 7A:
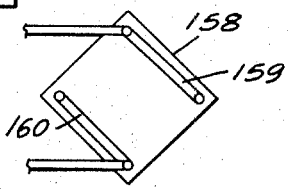
FIG. 7A is a fragmentary view of a portion of FIG. 7 in an alternate operating position.

Referring now to FIGS. 7 and 7A, in place of the switches S1 and S12, a switch S13 is provided and two diaphragm operated valves V1 and V2 are employed. The switch S13 has a supply connection 150 from any suitable source of fluid under pressure, and an external fluid connection 151 with internal fluid passageways 152, and is for selective positioning. The switch S13 has a fluid connection 154 extending therefrom which communicates with the differential detector D2, and with the valve V2 for shutting off flow through the fluid connection 33.

The switch S13 also has extending therefrom a fluid connection 155 which communicates with the differential detector D1 and with the valve V1 for shutting off flow through the fluid connection 14.

The output connections 24 and 25 of the differential detector D1 are directly connected to the nozzles 117 and 118 of the transmitter PT1, and the output connections 34 and 35 of the differential detector D2 are directly connected to the nozzles 117 and 118 of pressure transmitter PT2.

The fluid connections 44 and 45 are directly connected to an additional pair of nozzles 156 and 157 for the pressure transmitter PT1, and through a reversing plate 158 to either of the nozzles 156 and 157 of the pressure transmitter PT2. The reversing plate 158 has passageways 159 and 160 which may be disposed as shown either in FIG. 7 or in FIG. 7A depending on whether the controller C is connected for reverse or for direct action.

The operation of FIG. 7 is similar to that of FIGS. 1 and 2 in that it provides an automatic control mode and a manual control mode, dependent upon the position of the switch S13 which is shown in the automatic position. In the automatic position air under pressure supplied through the fluid connection 150 and the valve passageway 152 to the fluid connection 154 is available at diaphragm valve V2 to shut off flow in the fluid connection 33 and to supply fluid to the differential detector D2. The differential detector D2 is effective, as previously explained, to cause the output of pressure transmitter PT2 to become and remain equal to the pressure effective at the motor valve V.

Simultaneously, the appropriate valve passageway 152 or 153 vents connection 155 to the atmosphere through the external connection 151. Since the supply connection 155 is vented, the differential detector D1 is not effective for driving the pressure transmitter PT1 and since the diaphragm valve V1 is vented the connection 14 is open and effective for supplying the control fluid to the motor valve V.

The inclusion of the nozzles 156 and 157 eliminates the need for switches S3 to S10, as shown in FIG. 1, for alternate or selective driving of the turbine wheels 119 either from the differential detectors D1 or D2, or the manual control port device CP.

In FIG. 7, operation of the push buttons 46 or 47 will pressurize conduits 44 or 45, respectively, and the corresponding nozzles in either automatic or manual mode. With the station in the automatic mode of control as shown, the turbine wheel 119 of the pressure transmitter PT1 may be moved to a new position thereby and will remain in the position attained upon the release of the push button 46 or 47. When pressure is effective in the fluid connections 44 and 45, it is also effective at the nozzles 156 and 157 of the pressure transmitter PT2, tending to drive the turbine wheel 119, but this causes an imbalance which sets up an opposing pressure in the nozzles 117 and 118 to offset or counteract further motion of the turbine wheel 119 of the pressure transmitter PT2.

Upon release of the push buttons 46 or 47, the turbine wheel 119 of the pressure transmitter PT2 will be restored to its equilibrium position by the action of the differential detector D2.

When the station is in the manual control mode, the connection 155 is connected to the pressure supply 150 either through the valve passageway 152 or the valve passageway 153 and simultaneously the connection 154 is vented to the atmosphere through external connection 151. Under these conditions the diaphragm valve V1 will be closed, blocking the output of the controller C from the motor valve V and the output of the manual control pressure transmitter PT2 will be connected to the motor valve V.

Supply pressure will be available at differential detector D1 so that it can control the pressure transmitter PT1 to maintain its output pressure in connection 27 continuously equal to the pressure in the fluid connection 11.

The action of the control port device CP in its relation to the turbine wheel 119 of the pressure transmitter PT1 and upon the turbine wheel 119 of the pressure transmitter PT2 will be interchanged from that previously explained.

Figure 8:
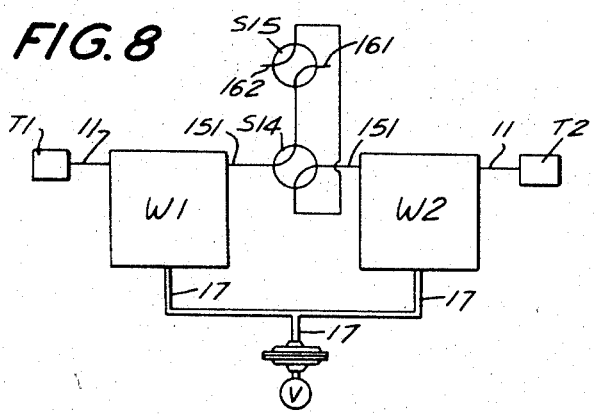
FIG. 8 is a schematic system diagram employing two of the controllers of FIG. 7.

Referring now to FIG. 8, the diagram there shown includes two of the station units W1 and W2 of FIG. 7 with their associated fluid pressure transmitters T1 and T2 which may be responsive to two conditions, for example temperature and pressure in a physical process, or may be two conditions at different locations in the process, both conditions being subject to control by the action of a single motor valve V. The exterior connections 151 of the units W1 and W2 are connected to one or more four way valves, such as valves S14 and S15, which are connected so that for any given position of these valves one of the connectors 151 is vented as at 161 to the atmosphere and the other is connected to a source 162 of fluid under pressure.

Whichever of the stations W1 and W2 is connected to the source 162 will be inactivated because both valves V1 and V2 will be pressurized and closed regardless of the position of the selector switch S13.

Furthermore, both differential detectors D1 and D2 will be supplied with fluid pressure and will be effective for causing the pressure transmitters PT1 and PT2 to follow the pressure changes from the corresponding pressure transmitter T and in connection 17, respectively.

The other station whose connection 151 is vented to the atmosphere will behave in the normal manner as previously described with respect to FIG. 7.

The four way valves S14 and S15 may be selectively switched at any time to place either of the control stations W1 or W2 in control and the other on standby, i.e. ready to take over control if desired, without bumping the process.

Figure 9:
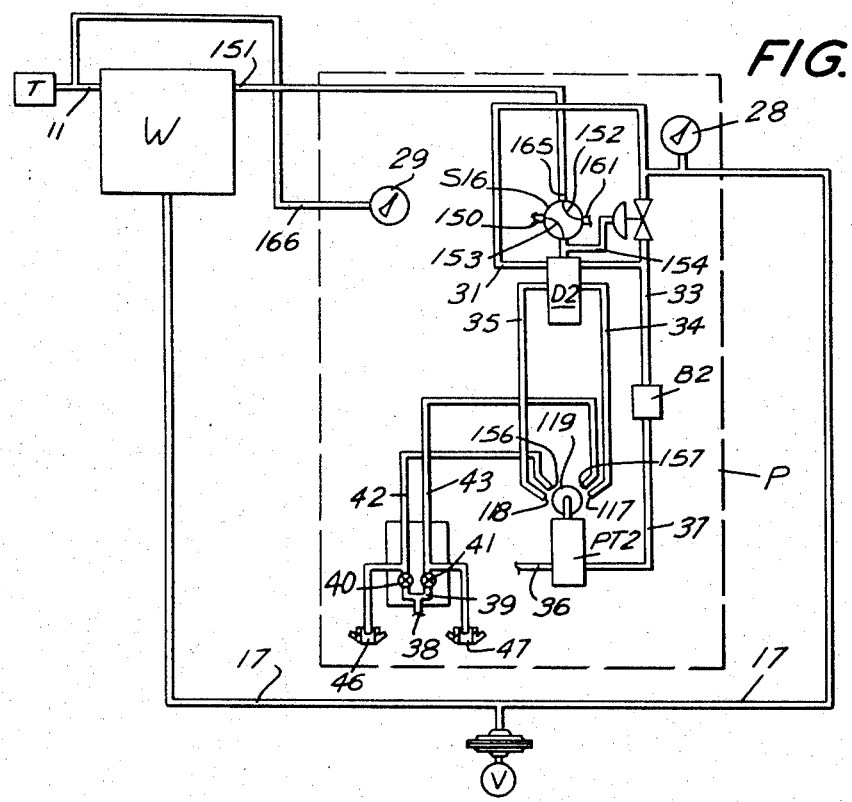
FIG. 9 is a schematic system diagram employing one of the controllers of FIG. 7 and an improved manual control station which permits a different character of control.

Referring now to FIG. 9, the system there shown illustrates another control system in accordance with the invention which has been found advantageous. The system comprises a controller W, as shown in FIG. 7, having a transmitter T connected thereto by a fluid connection 11 and being connected to a motor valve V by a fluid connection 17. The external connection 151 is connected to a special manual control station P, which is also connected by a fluid connection 17.

The manual control station P comprises a deviation detector D2 and a pressure transmitter PT2. The pressure transmitter PT2 may be adjusted by the differential detector D2 or by the control port device CP in a similar manner to that described with respect to FIG. 7, no reversing plate 158 being necessary.

A four way valve S16 has a supply connection 150 and a vent connection 161. Internal valve passageways 152 and 153 of the valve S16 can be positioned as desired. The fluid connection 154 connects one port of valve S16 to the supply connection of differential detector D2 and to the diaphragm of an air controlled shut off valve V2. Another connection 165 of the valve S16 is available for external use. The passageways 152 and 153 of the valve S16 dependent on their positioning will connect fluid connections 154 and 165 to either the supply 155 and vent 161, or vice versa.

An indicator 29 is provided with an external fluid connection 146 for use as desired, and may be connected to the fluid connection 11 to show the pressure prevailing at that location.

The system shown in FIG. 9 is useful where it is desired to control a process automatically or manually from one location with provision for an overriding manual control at a second location.

In normal operation the control station W would control the motor valve V, either manually or automatically as previously described. For this condition of operation the switch S16 will be in position shown in FIG. 9 with fluid pressure effective at valve V2 of control station P for closing fluid connection 33 of that control station.

The deviation detector D2 of control station P will control the output of its pressure transmitter PT2 causing it to continuously follow the pressure in fluid connection 17 so that at any time the switch S16 is switched to its alternate position the control station P will immediately load the fluid connection 17 at the same level already prevailing.

When the switch S16 is in the alternate position pressure fluid is supplied through the connection 165 to fluid connection 151 of control station W where it will be effective for cutting off the output of that station whether it be in the manual or in the automatic mode as described for FIG. 8. The system is now on manual control from control station P subject to manipulation of the control point device CP and during this time control station W will continuously synchronize both its pressure transmitters PT1 and PT2 so that either may take over control at such time as the switch S16 is switched back to its normal position.

Figure 10:
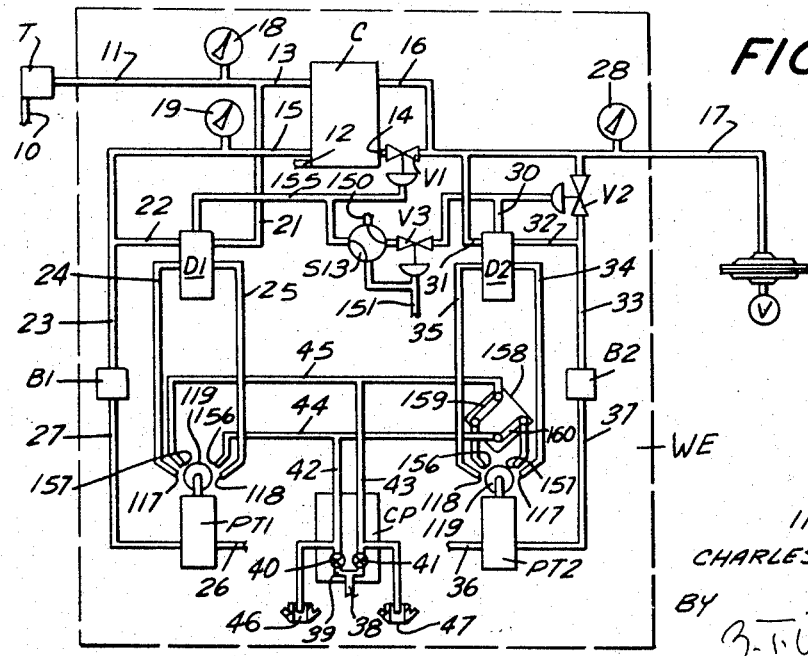
FIG. 10 is a schematic view of another preferred form of the invention also adapted for remote switching under different conditions than that of FIG. 7.

Referring now to FIG. 10 a control station WE in accordance with the invention is illustrated which is particularly useful in systems where more than one control loop is included.

The control station WE shown in FIG. 10 is very similar to that shown in FIG. 7 except for the addition of an air to close diaphragm valve V3 in the fluid connection 154 adjacent the switch S13. The diaphragm of valve V3 is connected to the external connection 131.

Figure 11:
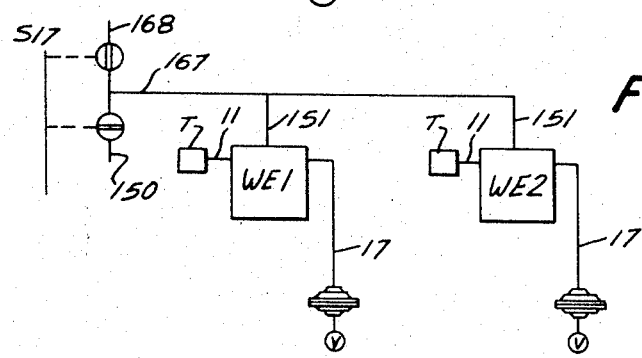
FIG. 11 is as schematic system diagram employing the controllers of FIG. 10.

Referring now to FIG. 11, a system is illustrated employing a plurality of stations WE, each provided with its transmitter T and motor valve V. The external connections 151 of all of such stations are connected to a common fluid connection 167. The fluid connection 167 is connected to a two position valve element S17 having a portion normally open to a vent connection 168 and a fluid pressure supply 150. In the position shown, S17 will vent connections 151 of the control stations WE and these stations each will operate in the manner previously described for the station W of FIG. 7.

If now the switch S17 is moved to its alternate position, fluid pressure will be admitted through the fluid connection 167 to each of the fluid connections 151 of the station WE.

If the switch S13 is in the position shown so that the station WE is in the automatic mode pressure applied at connection 151 will close diaphragm valve V3, shutting off pressure in fluid connection 154 which in turn will open the diaphragm valve V2, permitting the output pressure of the pressure transmitter PT2 to become effective for manual control of motor valve V. Simultaneously fluid pressure in connection 151 will become effective in connection 135 for closing diaphragm valve V1, cutting off the output of the controller C from the motor valve V.

The above described action will occur simultaneously in all the stations WE so connected so that all of the associated loops are immediately put in the manual control mode without any bump. If any of such stations were already in a manual mode because of the positioning of switch S13 in its alternate position, the application pressure to connection 151 will have no effect on the operation of that station and it will remain in the manual control mode because diaphragm V3 will be closed and prevent the application of pressure from connection 151 from reaching the diaphragm cutoff valve V2.

I claim:
1. In an automatic control system for a condition, means for regulating said condition,
a first analog signal source and a second analog signal source respectively providing first and second analog signals,
selector means having a plurality of positions including a first position for connecting said regulating means to respond to the analog signal from said first source and a second position for connecting said regulating means to respond to the analog signal from said second source,
comparator means responsive to the difference between said analog signals,
said comparator means including members for providing a third analog signal,
said third analog signal including a fluid pressure signal, and
connections for applying said fluid pressure signal for adjusting said second source to reduce said difference when said selector means is in said first position.

2. An automatic control system as defined in claim 1 in which
said comparator means has a member against which both said first and second analog signals are effective in opposite directions.

3. An automatic control system as defined in claim 2 in which
said first and second analog signals are fluid pressures.

4. An automatic control system as defined in claim 1 in which
said first analog signal source comprises transmitting means for providing an analog signal representing said condition.

5. An automatic control sytem as defined in claim 4 in which
said second analog signal control source is manually adjustable when said selector means is in said second position.

6. In an automatic control system for a condition,
transmitting means for providing an analog signal representing an actual value of said condition,
setting means for providing an analog signal for representing a desired value of said condition,
a controller for comparing said first analog signal with second analog signal and for providing an output analog signal which is a function of the difference between the actual and desired values of said condition,
selector means having a plurality of positions including a first position and a second position,
means responsive to said output signal for regulating said condition to reduce said difference when said selector means is in said first position,
said selector means in said second position disconnecting said output signal responsive means from said output signal,
comparator means responsive to the difference between the analog signal from said transmitting means and the analog signal from said setting means,
said comparator means including members for providing an additional analog signal,
said additional analog signal including a fluid pressure signal, and
connections for applying said fluid pressure signal for adjusting said setting means to reduce last said difference when said selector means is in said second position.

7. In an automatic control system for a condition,
transmitting means for providing a first analog signal representing an actual value of said condition,
setting means for providing a second analog signal for representing a desired value of said condition,
a controller for comparing said first analog signal with said second analog signal and for providing an output analog signal which is a function of the difference between the actual and desired values of said condition,
regulating means responsive to said output analog signal for regulating said condition to reduce said difference,
manual control means for providing an analog signal,
switching means having an automatic position and a manual position for selectively connecting said regulating means for responding to said controller output analog signal in the automatic position and to said manual control means analog signal in the manual position, and
comparator means responsive to the inequality between said controller output analog signal and the output analog signal at said regulating means for adjusting said setting means to reduce said inequality when said switching means is in the manual position.

8. An automatic control system as defined in claim 7 in which said first and second analog signal are fluid pressure signals.

9. An automatic control system as defined in claim 6 having additionally
manual control means for providing an analog signal,
said selector means connecting said output responsive means for responding to said manual control means analog signal in said second position.

10. An automatic control system as defined in claim 9 having
an additional comparator means responsive to the difference between said controller output analog signal and said manual control means analog signal for adjusting said manual control output means to reduce said last said difference when said switching means is in the automatic position.

11. An automatic control system as defined in claim 1 having
manually operable means,
connections between said manually operable means and said second analog signal source for making said manually operable means effective for changing the level of said second analog signal, and
means interposed in said connections for reversing the action of said manually operable means on said second analog signal source.

12. An automatic control for a process having a plurality of conditions,
a control system for each of said conditions,
each control system comprising
a controller responsive to said condition and having an output analog fluid pressure signal,
a regulator for said condition responsive to said signal,
a manually adjustable fluid pressure supplying means,
fluid pressure operated selector means for selectively
connecting said supplying means or said controller to said regulator,
each of said control systems having a common fluid connection to its fluid pressure operated selector means, and
control means for producing a pressure change in said fluid connection for simultaneously operating each of said selector means.

References Cited

UNITED STATES PATENTS 2,666,585 1/1954 Gess.
2,747,595 5/1956 Dickey.
2,939,472 6/1960 Eller.

ARNOLD ROSENTHAL, *Primary Examiner.*

U.S. Cl. X.R.

137—85; 251—26